United States Patent [19]

Hutchison

[11] Patent Number: 4,621,968
[45] Date of Patent: Nov. 11, 1986

[54] SEGMENTED AUGER CONVEYOR

[75] Inventor: Marion E. Hutchison, Waterloo, Iowa

[73] Assignee: Tiger Industries, Inc., Waterloo, Iowa

[21] Appl. No.: 778,891

[22] Filed: Sep. 23, 1985

Related U.S. Application Data

[63] Continuation-in-part of Ser. No. 567,899, Jan. 3, 1984, abandoned.

[51] Int. Cl.⁴ .............................................. B65G 65/46
[52] U.S. Cl. .................................. 414/311; 198/666; 414/310
[58] Field of Search ............... 414/310, 311, 312, 306, 414/321; 198/664, 666, 668, 676, 677

[56] References Cited

U.S. PATENT DOCUMENTS

| | | | |
|---|---|---|---|
| 2,138,576 | 11/1938 | Gebert | 198/666 |
| 3,337,068 | 8/1967 | Meharry | 198/666 |
| 3,584,732 | 6/1971 | Tyler et al. | 198/666 |
| 3,664,444 | 5/1972 | Henson | 198/666 |
| 4,368,003 | 1/1983 | MacDonald | 414/523 |

Primary Examiner—Leslie J. Paperner
Assistant Examiner—Stuart J. Millman
Attorney, Agent, or Firm—Dean P. Edmundson

[57] ABSTRACT

Auger conveyor apparatus is described which is adapted to convey bulk material. The conveyor includes a plurality of axially aligned and connected segments which are coupled in such a manner that one segment drives an adjacent segment after limited rotation relative to the adjacent segment. The connected segments are self-supporting, and incoming bulk material has access to the apparatus essentially along its full length. The apparatus may be used in a variety of applications including, among others, bottom unloading devices for storage structures.

25 Claims, 6 Drawing Figures

SEGMENTED AUGER CONVEYOR

CROSS-REFERENCE TO RELATED APPLICATION

This application is a continuation-in-part of my copending application Ser. No. 06/567,899, filed Jan. 3, 1984 now abandoned.

FIELD OF THE INVENTION

This invention relates to techniques and apparatus for moving bulk material. More particularly, this invention relates to auger conveyors adapted to move bulk material from one location to another.

BACKGROUND OF THE INVENTION

Various types of bulk materials are often stored in large structures (or sometimes just in large piles) until it is necessary to use them. This may include, for example, bulk materials which are fibrous, granular, or finely divided materials. Common examples of such materials are silage, wood chips, coal, grain, and the like. Where storage structures are used they are commonly cylindrical and may be of various diameters and heights. Other types of storage structures may have a length greater than their height and may have a floor or base section sloped toward a low point (which may be the center of the structure, for example).

When it is desired to remove some amount of the material from such storage means, it is normally not possible to simply open a door at the bottom of the storage means in order to let the material flow out. Fibrous materials, for example, will not flow. Finely divided or granular materials often will not flow properly if they become wet, frozen, or packed so tightly that they are bound together.

Although the bulk material could instead be removed from the storage means from the top side, this would require that an upright structure have a series of doors or other such access openings at various heights in the wall of the structure. This not only adds to the expense of the structure but it also increases the likelihood that undesirable air leakage into the structure will result. This would also require that the unloading apparatus be adapted to deliver bulk material out one of the openings in the wall irrespective of the level of bulk material in the structure.

The use of bottom unloading devices is very desirable because the storage structure may be kept sealed, if necessary. Furthermore, there is no need to utilize a series of vertically spaced doors in the wall of the storage structure.

Various types of bottom unloading devices have been proposed for use in unloading silos and grain bins. These unloading devices typically include a sweep arm which pivots around a central opening in the floor of the structure. The arm conveys bulk material to the central opening where other conveyance means transports the material beyond the outer wall of the storage structure.

Some of these prior devices utilize a circular track on the floor of the storage structure to guide and, in some designs, to actually drive the outer end of the sweep arm around the floor. In some of these designs the track is located at a point between the center and the wall of the structure. See, for example, U.S. Pat. Nos. 1,275,558; 2,914,198; 3,289,862; and 3,367,519. In other designs the circular track is disposed within a recess in the wall. See, for example, U.S. Pat. Nos. 3,282,4 3,298,543; 3,121,501; and U.S. Pat. No. Re. 25,863. In still another design the circular track is adjacent the wall of the structure. See U.S. Pat. No. 3,237,788.

There are many disadvantages associated with these former designs. For example, special installation of the equipment is required. The circular track can only be installed when the storage structure is empty. Where the design requires a track recessed in the wall of the structure, it is necessary for the structure to be specially designed in order to accommodate the apparatus. As a practical matter, apparatus of such design would be used only in storage structures which had been built so as to specially accommodate such apparatus.

Where the design relies upon a separate motor inside the storage structure to drive the outer end of the sweep arm, additional complications are presented. Not only is there the greater risk of equipment failure owing to the presence of a second motor, there is also additional drive equipment within the storage structure which must be operating properly in order to produce the desired result.

Various other types of bottom unloading devices have been described in the literature and many have been commercialized. For example, see the following U.S. Pat. Nos.: 2,969,156; 2,711,814; 2,934,224; 2,675,931; 2,635,770; and 3,298,543.

All of the foregoing types of apparatus for unloading a storage structure involve an auger or chain mechanism which rotates at the same rate of speed along its full length, i.e., each portion of the auger or chain mechanism moves at the same rate, because the auger and chain are unitary items. This requires that an exceedingly high amount of energy be supplied to the mechanism initially in order to start the entire mechanism in motion. When the conveyor is covered by the bulk material, the start-up load on the conveyor is extremely high and may exceed the normal operating load by several fold. Thus, it has been necessary to design the conveyor in a manner such that the entire apparatus (i.e., power source, drive train, and working portions) is capable of withstanding the very large forces associated with starting under load. This, of course, has a significant effect on the cost and size of the components used in the construction of the apparatus.

The present invention provides apparatus which overcomes these limitations and disadvantages.

SUMMARY OF THE PRESENT INVENTION

In accordance with the present invention there is provided auger conveyor apparatus which is segmented in a manner such that the starting load on the conveyor is very low. With continued rotation, successive segments of the conveyor are engaged until all of the segments are in operation. Total angular movement between the first segment at one end of the conveyor apparatus and the last segment at the opposite end of the conveyor is at least 360° and may be much more than that. The apparatus includes reversible drive means.

The apparatus of the invention thus reduces starting torque on the conveyor and also enables the use of smaller and less expensive power sources than would otherwise be required for a conveyor of conventional design having the same capacity. The novel apparatus may be used in a variety of applications including, for example, devices for bottom unloading of storage structures.

The apparatus of this invention is particularly useful in situations where there may be a partial or complete collapse of bulk material in a storage structure onto the apparatus. With conventional bottom unloaders a collapse of the bulk material necessitates time-consuming and very costly manual removal of the bulk material in order to free the unloader. The conveyor or apparatus of the present invention is adapted to sequentially engage its materialconveying segments in a manner that it is able to free itself.

Other advantages will be apparent from the following description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
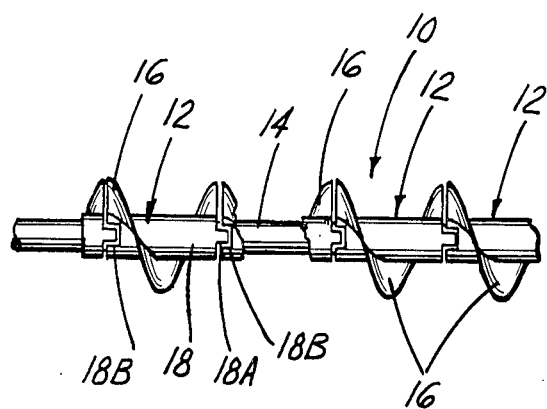
FIG. 1 is a side elevational view of a portion of one embodiment of segmented auger conveyor of the invention.

In FIG. 1 there is shown a portion of one embodiment of auger conveyor apparatus 10 of the invention. There are shown a plurality of segments 12 axially aligned on a central shaft or tube 14, as shown by the partial cutaway. Each segment includes flighting 16 on the exterior surface. The shaft 14 may be solid or hollow, as desired.

Preferably the flighting is helical, as shown, although it could be any other arrangement which is adapted to move bulk material along the segment from one end to the other. In one construction the length of each segment containing flighting is approximately equal to the pitch of the flighting (i.e., the helical flighting on each segment makes approximately one full turn). Of course, the length of each such segment may be longer, or shorter, as desired. For most applications the length of such segments is generally in the range of about 10 to 20 inches, although for auger conveyors which are extremely long the length of each segment may be approximately 10% of the length of the auger, for example. The segments of a particular auger conveyor may be of various lengths.

Adjacent segments are adapted to engage after limited rotation relative to each other by means of coupling means between adjacent segments. Thus, one segment may rotate relative to the next adjacent segment before rotational or angular motion is transmitted from one segment to the next adjacent segment. In this manner less power is required to initiate rotation of the auger conveyor than is the case with solid, one-piece auger conveyors.

There are many ways to effect the type of successive angular engagement required in the present invention. In FIG. 1 each segment includes an annular central hub 18. The coupling means in this embodiment are contained within the hub itself. Thus, one end of the hub includes a lug or protrusion 18A which projects axially outward from the main body of the hub 18. On the opposite end of the hub there is a slot 18B which is larger than lug 18A and which permits one segment to rotate relative to the adjacent segment to a limited extent. The width of slot 18B may vary to provide the desired degree of free rotation of one segment relative to another. Of course, with this design the degree of rotation between two adjacent segments will be less than 360°. The segments 12 are carried on central shaft 14 for support but are not rotationally secured thereto. In order to drive the auger conveyor a power source (such as an electric motor, for example) is operably connected to one of the segments, normally to the outermost segment where the bulk material is to be discharged. As rotation continues, successive segments are engaged. The number and length of the segments may vary with the intended application, although there is no absolute limit to the length of the auger conveyor.

The total angular movement between the first segment at one end of the apparatus and the last segment at the opposite end of the apparatus is at least 360°. Preferably the total angular movement is at least 720° or more.

The several segments are connected to each other. For example, they may all be supported on a common central hub or shaft. The auger conveyor apparatus is self-supporting and thus able to withstand beam loads in a direction normal to the axis of the auger. Also, because the segments cannot be axially separated, the auger has tensile integrity.

The segments may each be connected to the central shaft in a manner permitting angular movement but not axial movement along the shaft. Alternatively, the segments may be arranged in end-to-end fashion on a central shaft and then secured thereto by means of a keeper, pin, or other such retention means placed on the outer end of the central shaft to prevent axial movement of the segments. The retention means thus holds the segments in driving engagement with each other. The segments have a common center line.

Another advantage of the auger conveyor apparatus of this invention is that it is accessible to incoming material essentially along its full length. In other words, the auger apparatus of this invention is not contained within a tube or any other cover or housing as is required for conventional auger systems.

The auger conveyor apparatus of the invention is very useful in moving bulk material, whether the material is in the form of a large uncontained pile or is contained within a storage facility (e.g. a large bin or silo). If difficulty in start-up of the conveyor apparatus is encountered or anticipated, the operator runs the auger drive in a reverse direction until the segments are fully unwound. That is, the auger is operated in reverse until the last segment is rotated in reverse or until an overload condition is sensed on the drive system.

Then the auger is driven in the normal forward direction. The first segment to be driven is started readily since it has a short length and thus engages only a small portion of the total load. As the first segment rotates it operates as a helical conveyor, and a portion of the bulk material which is influenced by this first segment is moved axially along the segment to the discharge point.

The removal of even a very small percentage of the bulk material within the influence of the first segment is sufficient to cause a large decrease in the drive torque required for rotating the segment. When the angular clearance between the first and second segments is taken up, then there is ample torque available to start rotation of the second segment. Material which is influenced by the second auger segment is now moved axially by the helical flighting into the area of influence of the first segment, while material is likewise being moved along the first segment and expelled from the auger.

In this manner each successive segment, as it is started, clears itself by moving material into a void created by the action of the adjacent segment toward the first end of the auger system. As successive segments are engaged and rotated, the torque required increases initially and then decreases somewhat as more material is expelled by the auger system. If the torque limits of the drive system are reached before the last conveyor segment is started, then it is only necessary to reverse the drive direction to take the slack out of the couplings between segments. Then the drive means can again be operated in a forward direction. Each time this process is repeated more material is expelled from the discharge end of the auger conveyor and more load is relieved from the auger. In this manner an overload of the auger conveyor can be cleared. This is a significant advantage over conventional auger systems not having these capabilities.

Figure 2:
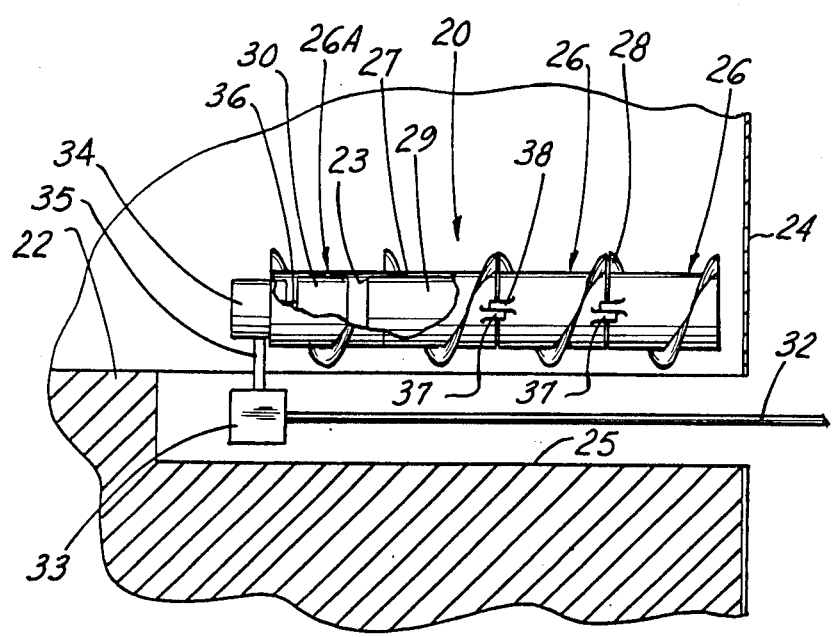
FIG. 2 Is a side elevational view of another embodiment of auger conveyor of this invention adapted for use in apparatus for bottom unloading of storage structures.

In FIG. 2 there is shown an elevational view of another embodiment of apparatus of the invention which is adapted for bottom unloading of a storage structure having floor 22, wall 24, and radial trough or recess 25 in the floor. The apparatus includes sweep auger 20 which pivots around the floor of the structure and conveys bulk material to the center of the structure where it falls into appropriate discharge conveyor apparatus located in trough 25. The discharge conveyor may comprise, for example, one or two conventional augers to move the bulk material out through an opening in wall 24.

Sweep arm 20 in this embodiment includes a plurality of axially aligned and connected auger conveyor segments 26 comprising tubular shell 27 carrying flighting 28. Each segment is supported on an elongated central tube 29. The inner end of tube 29 is securely attached to the first segment 26A (e.g., by appropriate weld 23). Segment 26A is securely fastened to reversible drive means 30 powered by means of rotating shaft 32 operably connected to a power source such as an electric motor. Gear boxes 33 and 34 and shafts 35 and 36 transfer the rotational energy to drive means 30. One such type of drive system for bottom unloading apparatus is described in my copending application Ser. No. 06/567,898, filed Jan. 3, 1984, now U.S. Pat. No. 4,583,903, and incorporated herein by reference.

In the embodiment of sweep arm shown in FIG. 2 each segment 26 is adapted to drive an adjacent segment after limited rotation relative thereto. Each segment includes a cam or lug 37 which projects radially outwardly, as shown, from one end thereof. The opposite end of each segment includes a cam or lug 38 which also projects outwardly beyond the hub. When lug 37 of one segment is urged against lug 38 on an adjacent segment, the adjacent segment is thereby engaged and thereafter rotates in unison with the driving segment. If desired there may be more than one such lug or cam projecting outwardly from one end of each segment so that the extent of rotation of one segment relative to another prior to engagement is more limited. For example, when there are three such lugs equidistantly spaced around one end of one segment, the maximum degree of free rotation relative to the adjacent segment is 120°.

The conveyor apparatus shown in FIG. 2 is adaptable in storage structures of any size. In typical bottom unloading operations a central open dome or arch is formed near the floor of the structure, with the column of bulk material being supported by a compacted annular ring of material along the wall of the structure.

On occasion the bulk material collapses into this dome and buries the unloading apparatus. When this happens, conventional bottom unloading apparatus must be manually dug out in order to free it. This is a very time-consuming and costly process.

The apparatus of FIG. 2 is adapted to dig itself out from a collapsed dome situation. Initially the auger drive means is rotated in reverse to assure maximum range of forward movement of each segment before engagement of the next adjacent segment. Then the auger drive means is rotated in forward motion, whereby the individual auger segments are successively engaged. In this manner a small amount of bulk material is removed from the center first and then successive amounts are removed outwardly from the center. If necessary, the auger drive means may be again rotated in reverse to unwind the segmented auger, after which the auger drive means is rotated in forward direction again. This process may be repeated as often as necessary to free the unloader and create a new dome. The segments at the outer end of the apparatus are typically shorter than the segments at the inner end of such apparatus.

Figure 3:
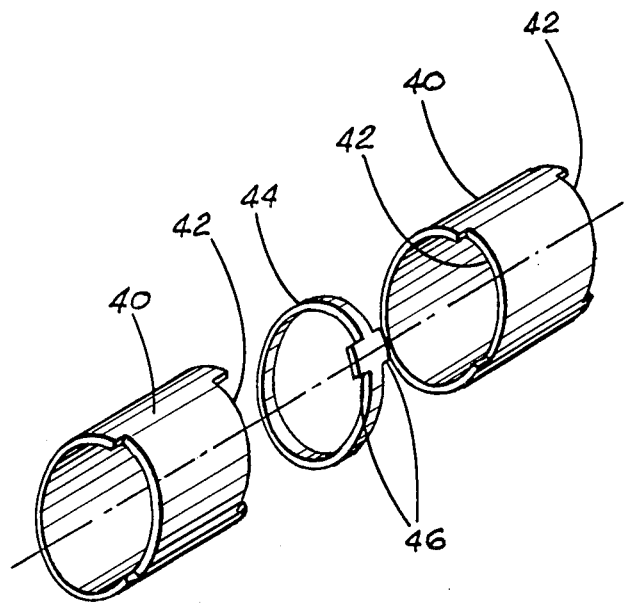
FIG. 3 is an explosion view of a portion of another embodiment of the present invention.

In FIG. 3 there is an explosion view illustrating another manner in which adjacent auger conveyor segments may be coupled together. In this embodiment the segments include central hubs 40 whose ends include notches or recesses 42 therein. Any desired flighting may be included on the segments. Between adjacent segments 40 is positioned an annular ring 44 which carries lugs or cams 46 on opposite sides, as shown. Each lug or cam 46 is adapted to be received in the notch 42 in the hub of the segment next to it. Since the notch 42 has a length greater than cam 46, there is an amount of relative rotation permissible between adjacent segments before one segment 40 may drive the adjacent segment 40.

Figure 4:
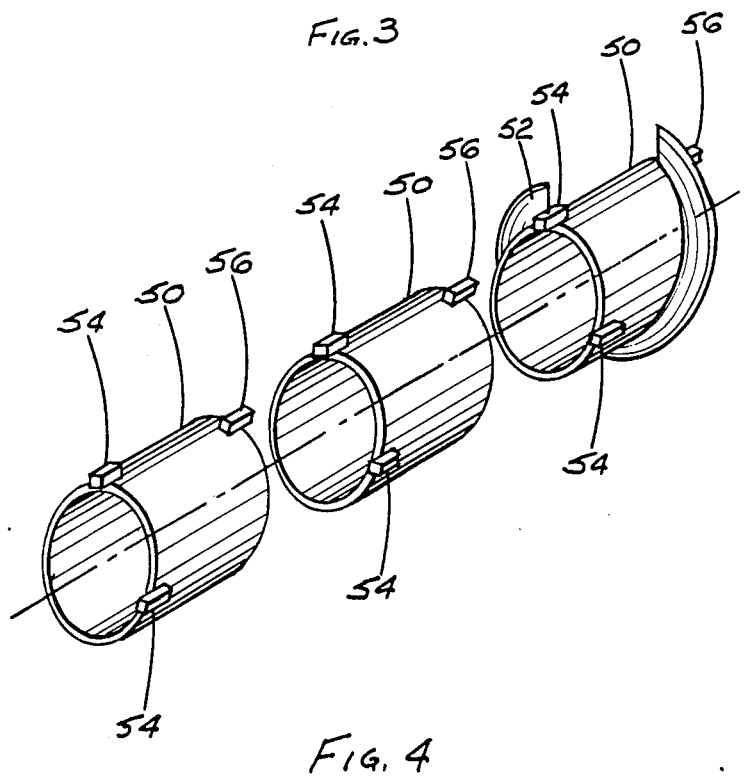
FIG. 4 is an explosion view of a portion of another embodiment of the present invention.

FIG. 4 is an explosion view illustrating another manner in which adjacent auger conveyor segments are adapted to be coupled in driving engagement, with limited relative motion between segments. Each segment includes a central hub 50 to which is affixed appropriate flighting 52. Also included on one end of each segment are two lugs or cams 54 which project radially outward beyond the main body of the hub, as shown. On the opposite end of each segment is a lug or cam 56 which projects radially outward beyond the main body. Thus, lug 56 is adapted to engage one of the lugs 54 secured to the central hub of the adjacent segment. Lugs 54 may be positioned at any desired location around the hub in order to define the extent of desired limited movement between adjacent segments.

Figure 5:
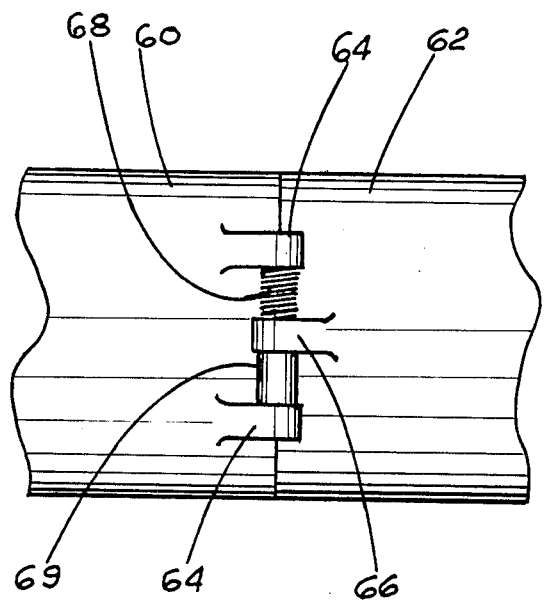
FIG. 5 is a side view of a portion of still another embodiment of the present invention.

In FIG. 5 there are shown two different embodiments of resilient or elastic coupling means. Thus, there are shown adjacent segments 60 and 62 which are axially aligned. Each segment includes appropriate flighting of an auger conveyor. One end of segment 60 carries two lugs or cams 64 on the exterior surface thereof. These lugs project beyond the edge of the main body of the segment, as shown. On adjacent segment 62 there is carried lug or cam 66 which projects radially outward beyond the main body of the segment in such a manner that it cannot be rotated past lugs 64 on segment 60. Disposed between lug 66 and lug 64 is a spring 68 to provide a resilient coupling between the lugs. Also illustrated in this Figure is an alternative coupling means 69 comprising a resilient, elastic body such as rubber.

Figure 6:
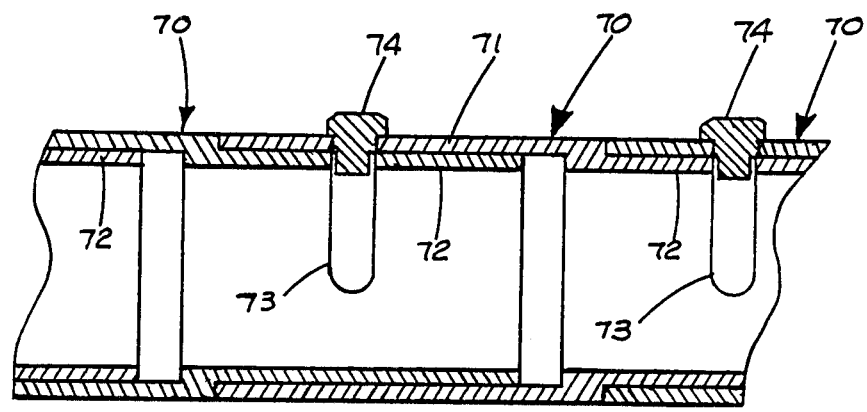
FIG. 6 is a side view of a portion of yet another embodiment of the present invention.

In FIG. 6 there is shown a cross-sectional view of yet another embodiment of auger conveyor of the invention and a different type of coupling means. Axially aligned segments 70 include annular hub section 71 and a stepped down annular section 72. The size of the two sections is such that the stepped down section 72 may be slidingly received within hub section 71 of an adjacent segment, as shown in the drawings. Section 72 of each segment also includes an elongated slot 73 transversely aligned. Bolt 74 is threadably received in an aperture in section 71, as shown, and extends into slot 73 in section 72. Thus, bolt 74 retains section 71 of one segment onto section 72 of an adjacent segment and prevents axial disengagement. Bolt 74 and slot 73 limit the extent to which section 72 of one segment may rotate before engaging section 71 of the adjacent segment.

In the embodiment of FIG. 6, each segment is adapted to support the adjacent segment. Thus, there is no need to mount each segment onto a central shaft.

In this invention there is no limit to the diameter of the auger conveyor segments which may be used. Also, any number of segments may be coupled to make an auger conveyor of any desired length. If the apparatus of the invention is intended for use in conveying materials which flow easily and have no appreciable tendency to pack (e.g., small grains and the like), then the segments may be longer than would be the case for apparatus intended for use in conveying materials such as haylage which packs and has a tendency to bridge and present itself to the conveyor as clumpy or semi-layered material. This type of compacted material also has high shear strength.

The segmented auger conveyor may be adapted for use in various applications. For example, it may be adapted for use as a sweep arm in bottom unloading apparatus, as described herein. The auger conveyor may also be used to move bulk material from large piles or from storage structures of various sizes and shapes. Furthermore, it is not necessary for each segment to include flighting of the same type and size, nor is it necessary for each segment to include flighting so long as there are a sufficient number of segments which include flighting capable of moving bulk material along the auger conveyor apparatus. It is also possible for the coupling means to be disposed internally within the central hub of each segment, if desired.

The segmented auger conveyor is distinctly different in nature from an input clutch which allows delayed load pick-up. Such a clutch does not reduce the start-up torque requirement but only allows the motor to approach the load under supposedly optimum conditions of speed and torque. The segmented auger conveyor, on the other hand, allows the load to be divided into as many increments as desired so that start-up torque is very low.

The auger conveyor apparatus of the invention may also include a plurality of material-dislodging teeth which project outwardly from the conveyor. Each tooth comprises a pointed end carried by the leading end of a shank inclined in the direction of travel of the tooth. The trailing end of the shank is connected to support means carried by the conveyor, and the support means has a curved leading surface. The use of this type of tooth is described in my copending application Ser. No. 06/567,898, filed Jan. 3, 1984, now U.S. Pat. No. 4,583,903, and incorporated herein by reference.

Other variants are possible without departing from the scope of the present invention.

What is claimed is:

1. Auger conveyor apparatus adapted to convey bulk material, said apparatus comprising reversible drive means, a plurality of axially aligned and connected segments which are adapted to be driven by said drive means, and coupling means between adjacent segments, said coupling means being adapted to transmit rotational motion from one said segment to a said adjacent segment, wherein said coupling means is further adapted to permit limited angular movement between said adjacent segments when the direction of drive rotation of said auger conveyor apparatus is reversed, wherein the total angular movement between a first said segment at one end of said apparatus and the last said segment at the opposite end of said apparatus is at least 360°, and wherein said connected segments are self-supporting.

2. Auger conveyor apparatus in accordance with claim 1, wherein said segments are carried and supported on a central shaft.

3. Auger conveyor apparatus in accordance with claim 1, wherein said coupling means comprise lugs carried by said segments, wherein said lugs on each said segment are adapted to engage said lugs on an adjacent said segment.

4. Auger conveyor apparatus in accordance with claim 1, wherein said coupling means are internally disposed within said segments.

5. Auger conveyor apparatus in accordance with claim 1, wherein each said segment includes an annular central hub.

6. Auger conveyor apparatus in accordance with claim 5, wherein said coupling means are disposed within said central hub.

7. Auger conveyor apparatus in accordance with claim 1, wherein said segments include conveyance means on the exterior surface capable of moving said bulk material along said segments.

8. Auger conveyor apparatus in accordance with claim 7, wherein said conveyance means comprises flighting.

9. Auger conveyor apparatus in accordance with claim 8, wherein said flighting is helical.

10. Auger conveyor apparatus in accordance with claim 9, wherein the length of each said segment is approximately equal to the pitch of said flighting.

11. Auger conveyor apparatus in accordance with claim 1, wherein each said segment is in the range of about ten to twenty inches long.

12. Auger conveyor apparatus in accordance with claim 2, wherein said central shaft comprises a cylindrical tube.

13. Auger conveyor apparatus in accordance with claim 1, wherein said coupling means comprises (a) a lug projecting axially beyond the edge of one said segment, and (b) at least one stop means carried by the adjacent segment, wherein one said segment is rotatable relative to said adjacent segment until said lug engages said stop means.

14. An unloading apparatus of the type adapted to unload bulk material from a generally cylindrical storage structure having a central opening in the floor thereof, wherein said apparatus includes (a) a sweep arm adapted to extend radially from said central opening to a point near the wall of said structure and being further adapted to loosen and transport said material from said storage structure to said opening, (b) conveyor means which is operatively associated with sweep arm and having a portion which is adapted to be disposed beneath said central opening and further adapted to convey said material from said opening to a point beyond the wall of said structure, and (c) drive means; wherein said drive means is reversible; wherein said sweep arm comprises auger conveyor apparatus which comprises a plurality of axially aligned and connected segments, wherein coupling means are adapted to transmit rotational motion from one said segment to an adjacent said segment, wherein said coupling means is further adapted to permit limited angular movement between adjacent said segments when the direction of drive rotation of said auger conveyor apparatus by said drive means is reversed, wherein the total angular movement between a first said segment at one end of said apparatus and the last said segment at the opposite end of said apparatus is at least 360°, and wherein said connected segments are self-supporting.

15. Unloading apparatus in accordance with claim 14, wherein said segments are carried and supported on an elongated cylindrical shaft.

16. Unloading apparatus in accordance with claim 15, wherein said coupling means comprises (a) a lug projecting axially beyond the edge of one said segment, and (b) at least one stop means carried by the adjacent segment, wherein one said segment is rotatable relative to said adjacent segment until said lug engages said stop means.

17. Unloading apparatus in accordance with claim 14, wherein the majority of said segments include flighting on their exterior surface, wherein said flighting is adapted to move said bulk material from one end of said segment to the other end thereof.

18. Unloading apparatus in accordance with claim 17, wherein said flighting is helical.

19. Unloading apparatus in accordance with claim 18, wherein the length of each said segment is approximately equal to the pitch of said flighting.

20. Unloading apparatus in accordance with claim 14, wherein each said segment is in the range of about ten to twenty inches long.

21. Unloading apparatus in accordance with claim 14, wherein each said segment includes an annular central hub.

22. Unloading apparatus in accordance with claim 14, wherein said coupling means is disposed within said central hub.

23. Unloading apparatus in accordance with claim 17, further comprising a plurality of material dislodging teeth carried by said conveyor means and projecting outwardly therefrom, wherein each said tooth comprises a pointed end carried by the leading end of a shank inclined in the direction of travel of said tooth, wherein the trailing end of said shank is connected to support means carried by said conveyor, and wherein said support means has a curved leading surface.

24. Unloading apparatus in accordance with claim 23, wherein said curved leading surface has a radius of curvature of at least about 0.1 inch.

25. Auger conveyor apparatus adapted to convey bulk material, said apparatus comprising reversible drive means, a plurality of axially aligned segments which are adapted to be driven by said drive means, retention means adapted to hold said segments in end-to-end arrangement, coupling means between adjacent segments, said coupling means being adapted to transmit rotational motion from one said segment to a said adjacent segment, wherein said coupling means is further adapted to permit limited angular movement between said adjacent segments when the direction of drive rotation of said auger conveyor apparatus is reversed, and wherein the total angular movement between a first said segment at one end of said apparatus and the last said segment at the opposite end of said apparatus is at least 360°.

* * * * *